US012486697B2

(12) United States Patent
Zhao

(10) Patent No.: US 12,486,697 B2
(45) **Date of Patent: *Dec. 2, 2025**

(54) CABLE LOCK WITH LOCATOR

(71) Applicant: Shenzhen Wins Electronic Technology Co., Ltd., Shenzhen (CN)

(72) Inventor: Shengfei Zhao, Shenzhen (CN)

(73) Assignee: Shenzhen Wins Electronic Technology Co., Ltd., Shenzhen (CN)

( * ) Notice: Subject to any disclaimer, the term of this patent is extended or adjusted under 35 U.S.C. 154(b) by 208 days.

This patent is subject to a terminal disclaimer.

(21) Appl. No.: 18/243,267

(22) Filed: Sep. 7, 2023

(65) Prior Publication Data

US 2024/0368923 A1 Nov. 7, 2024

(51) Int. Cl.

| | |
|---|---|
| ***E05B 67/00*** | (2006.01) |
| ***E05B 67/38*** | (2006.01) |
| ***E05B 73/00*** | (2006.01) |
| ***G08B 13/14*** | (2006.01) |

(52) U.S. Cl.

CPC ............ *E05B 67/003* (2013.01); *E05B 67/38* (2013.01); *E05B 73/0005* (2013.01); *E05B 73/0029* (2013.01); *G08B 13/1463* (2013.01)

(58) Field of Classification Search

CPC ...... E05B 67/003; E05B 67/006; E05B 67/38; E05B 67/383; E05B 73/0005; E05B 73/0011; E05B 73/0029; E05B 73/0082; G08B 13/1463; G08B 13/2434

See application file for complete search history.

(56) References Cited

U.S. PATENT DOCUMENTS

| | | | | |
|---|---|---|---|---|
| 5,754,108 | A * | 5/1998 | Ungarsohn | G08B 13/1463 340/687 |
| 6,888,241 | B1 * | 5/2005 | Korn | G09F 3/0347 257/730 |
| 7,726,708 | B2 * | 6/2010 | Bourrieres | E05B 39/00 292/307 R |
| 9,222,285 | B1 * | 12/2015 | Ilislamloo | E05B 73/0005 |
| 9,640,051 | B2 * | 5/2017 | Conaty | G08B 13/12 |
| 9,830,759 | B2 * | 11/2017 | Hilton | E05B 73/0005 |
| 10,529,207 | B1 * | 1/2020 | Yang | E05B 73/0029 |
| 11,773,626 | B2 * | 10/2023 | Bullard | E05B 73/0005 70/51 |
| 2018/0190057 | A1 * | 7/2018 | Heinz | E05B 67/003 |
| 2023/0258026 | A1 * | 8/2023 | Bullard | E05B 73/0005 70/51 |

FOREIGN PATENT DOCUMENTS

CN 102923415 A 2/2013

* cited by examiner

*Primary Examiner* — Christopher J Boswell

(74) *Attorney, Agent, or Firm* — Birchwood IP

(57) ABSTRACT

A cable lock with a locator includes a disposable part and a recyclable part. The disposable prat includes a metal cable and a first lock body. The recyclable part includes a second lock body. The first lock body is provided with an RFID device. The second lock body is provided with a locator. The first lock body and the second lock body can be integrated into one piece by a detachable structure. The present application has the beneficial effects that the locator can realize the locating function of the cable lock, so as to realize the real-time locating function of the locked container. On this basis, the locator is recycled, and the locating function can be realized with decreased use cost as much as possible.

16 Claims, 11 Drawing Sheets

CABLE LOCK WITH LOCATOR

CROSS-REFERENCE TO RELATED APPLICATIONS

This is a U.S. patent application which claims the priority and benefit of Chinese Patent Application Number 202310495427.2, filed on May 4, 2023, the disclosure of which is incorporated herein by reference in its entirety.

TECHNICAL FIELD

The present application relates to a cable lock, in particular to a cable lock with a locator.

BACKGROUND

Cable locks are mainly used for locking containers. At present, there exist two types of cable locks. With one type of cable lock, one can check whether the metal cable had been cut only by naked eyes. With the other type of cable lock, one can check whether the cable lock had been unlocked by the uploaded data through Radio Frequency Identification (RFID) tags after the metal cable had been cut.

The above two types of cable locks do not have real-time locating and real-time signal sending functions. The specific function of the electronic cable lock and its usage under specified scenes cannot be realized.

The inventor finds that there are no commercially available products that can meet the above requirements. In addition, according to the inventor's search and analysis of the prior art, only some introductions of technologies with real-time locating and status-sending devices found, such as the patent publication No. CN102923415A, entitled "Container door multi-frequency safety electronic label seal and monitor method thereof" filed by the applicant "Sheng Jun" on Nov. 12, 2012.

However, the patent publication is aimed at the multi-frequency security electronic signature seal of the door, which is mainly composed of a signature seal body and a U-shaped metal lock rod, not used in a cable lock, and the communication module of its Global Positioning System (GPS) module is integrally arranged on the electronic signature seal, thus the production and use cost is too high to be implemented as a specific product.

In the practical use scenario, each container needs a cable lock, so the demand for cable locks in logistics and transportation is huge, which poses huge demand for cable locks. Therefore, it is important to realize the locating function in the cable locks without significantly increasing the cost in the industry, in view of the huge demand for the cable locks.

SUMMARY

In order to at least alleviate the related problems in the prior art, in a disclosure of the present application a cable lock with a locator is provided.

In an embodiment of the disclosure, the cable lock with a locator includes a disposable part and a recyclable part.

In an embodiment, the disposable part includes a metal cable and a first lock body, and the first lock body is provided with a RFID device.

In an embodiment, the recyclable part includes a second lock body, and a locator is arranged on the second lock body.

In an embodiment, the first lock body and the second lock body are connected by means of a detachable structure. The detachable docking structure can be selected from a variety of docking structures, such as plug-in connectors, threaded connectors and other structures.

In an embodiment, the second lock body is provided with a data transmitter, and the locator is electrically connected with the data transmitter.

In an embodiment, the RFID device is electrically connected with the data transmitter.

In an embodiment, the first lock body is provided with a first connector, and the second lock body is provided with a second connector; the first connector is electrically connected with the second connector when the first lock body and the second lock body are connected into one piece.

In an embodiment, the RFID device is electrically connected with the first connector, and the data transmitter is electrically connected with the second connector.

In an embodiment, one of the first connector and the second connector is a pogo pin interface.

In an embodiment, when the second connector is a pogo pin interface, the first lock body is provided with a guiding plate; and when the first connector is a pogo pin interface, the second lock body is provided with a guiding plate.

In an embodiment, the guiding plate has a lead-in slope and a lead-out slope.

In an embodiment, the first lock body is provided with a power supply which is electrically connected with the first connector.

In an embodiment, the data transmitter is a Global System for Mobile Communications (GSM) device or a General Packet Radio Service (GPRS) device.

In an embodiment, the second lock body is provided with an antenna that is electrically connected with the data transmitter.

In an embodiment, the detachable structure is a T-shaped docking structure, and the T-shaped docking structure includes a T-shaped guide rail, and a T-shaped slider in sliding fits with the T-shaped guide rail. The arrangement in which the T-shaped guide rail is provided at the upper end can form an enclosed structure, which is waterproof and has great advantages over the arrangement in which the T-shaped slider is provided at the upper end. The arrangement in which the T-shaped slider is provided at the lower end can form a raised boss structure distal to the water inlet gap, thus preventing internal water soaking caused by rain.

In an embodiment, the T-shaped guide rail and the T-shaped slider are correspondingly arranged on the first lock body and the second lock body respectively.

In an embodiment, an end of the T-shaped slider is provided with a position limit step. To realize the firm integration of the two devices, it is necessary to realize the firm integration of the upper, lower, left and right directions between the two devices. In this embodiment, the T-shaped guide rail is integrated with the position limit step to realize the fixation of three directions, and then the cable is inserted to realize the fixation of the four directions, that is, the T-shaped guide rail is a preferred solution selected when several methods are considered.

In an embodiment, a power supply is arranged on the first lock body and/or the second lock body, and the power supply is electrically connected with the locator.

In an embodiment, an end of the metal cable is fixed on the first lock body.

In an embodiment, the second lock body is provided with a lock core, and when the metal cable passes through the lock core in one direction, the lock core locks the metal cable in the opposite direction.

In an embodiment, the first lock body is provided with a power microswitch for triggering the power supply, and the power microswitch is triggered when the cable passes through the first lock body.

In an embodiment, both the first lock body and the second lock body are provided with a through hole through which the metal cable passes through.

In an embodiment, the locator is any one or more of, a GPS device, a Beidou positioning system device, or a Galileo positioning system device.

In an embodiment, the disposable part includes a metal cable and a first lock body. The first lock body is provided with an RFID device. The metal cable is a steel cable. The recyclable part includes a second lock body, and a locator is arranged on the second lock body. The first lock body and the second lock body are connected by means of a detachable structure, the second lock body is provided with a data transmitter, and the locator is electrically connected with the data transmitter. The RFID device is electrically connected with the data transmitter. The first lock body is provided with a first connector, and the second lock body is provided with a second connector; the first connector is electrically connected with the second connector when the first lock body and the second lock body are connected into one piece. The RFID device is electrically connected with the first connector. The data transmitter is electrically connected with the second connector. One of the first connector and the second connector is a pogo pin interface, when the second connector is a pogo pin interface, the first lock body is provided with a guiding plate; and when the first connector is a pogo pin interface, the second lock body is provided with a guiding plate. The guiding plate has a lead-in slope and a lead-out slope. The first lock body is provided with a power supply device which is electrically connected with the first connector. The data transmitter is a GSM device or a GPRS device. The second lock body is provided with an antenna that is electrically connected with the data transmitter.

In an embodiment, the disposable part includes a metal cable and a first lock body. The first lock body is provided with an RFID device. The metal cable is a steel cable. The recyclable part includes a second lock body, and a locator is arranged on the second lock body. The first lock body and the second lock body are connected by means of a detachable structure. The second lock body is provided with a data transmitter, and the locator is electrically connected with the data transmitter. The RFID device is electrically connected with the data transmitter. The first lock body is provided with a first connector, and the second lock body is provided with a second connector; the first connector is electrically connected with the second connector when the first lock body and the second lock body are connected into one piece. The RFID device is electrically connected with the first connector. The data transmitter is electrically connected with the second connector. One of the first connector and the second connector is a pogo pin interface, when the second connector is a pogo pin interface, the first lock body is provided with a guiding plate; and when the first connector is a pogo pin interface, the second lock body is provided with a guiding plate. The guiding plate has a lead-in slope and a lead-out slope. The first lock body is provided with a power supply which is electrically connected with the first connector. The data transmitter is a GSM device or a GPRS device. The second lock body is provided with an antenna that is electrically connected with the data transmitter. The detachable structure is a T-shape docking structure. The T-shaped docking structure includes a T-shaped guide rail, and a T-shaped slider in sliding fits with the T-shaped guide rail. The T-shaped guide rail and the T-shaped slider are correspondingly arranged on the first lock body and the second lock body respectively. An end of the T-shaped slider is provided with a position limit step. An end of the metal cable is fixed on the first lock body. The second lock body is provided with a lock core, and when the metal cable passes through the lock core in one direction, the lock core locks the metal cable in the opposite direction. The first lock body is provided with a power microswitch for triggering the power supply, and the power microswitch is triggered when the cable passes through the first lock body. The first lock body and the second lock body are both provided with a through hole through which metal cable passes. The locator is at least one of, a GPS device, a Beidou positioning system device, or a Galileo positioning system device.

There are following beneficial effects in the disclosure. According to the above embodiments, the traditional one-piece lock body is divided into two parts, i.e., a disposable part and a recyclable part. After unlocking, the disposable part including the metal cable and the RFID device is discarded. The recyclable part including the locator is recycled for subsequent assembling for a new cable lock with locator. The locating function of the cable lock can be realized due to the locator, so as to realize the real-time locating function of the locked container. On this basis, the locator can be recycled, which can realize the locating function with increasing the use cost as less as possible, through reducing the amount of the locators, which means reducing the waste of the locator. As such, the generation of electronic waste is reduced. With the locating function achieved and cost controlled, environmental protection is also achieved, and the needs of wider use scenarios are met.

BRIEF DESCRIPTION OF DRAWINGS

In order to illustrate the technical solutions in the embodiments of the disclosure, the drawings related to the description of the embodiments will be briefly introduced below. It is apparent that, the drawings described below are only some embodiments of the disclosure. Those having ordinary skills in the art can derive other solutions according to these drawings without devoting creative effort.

DETAILED DESCRIPTION

Figure 1:
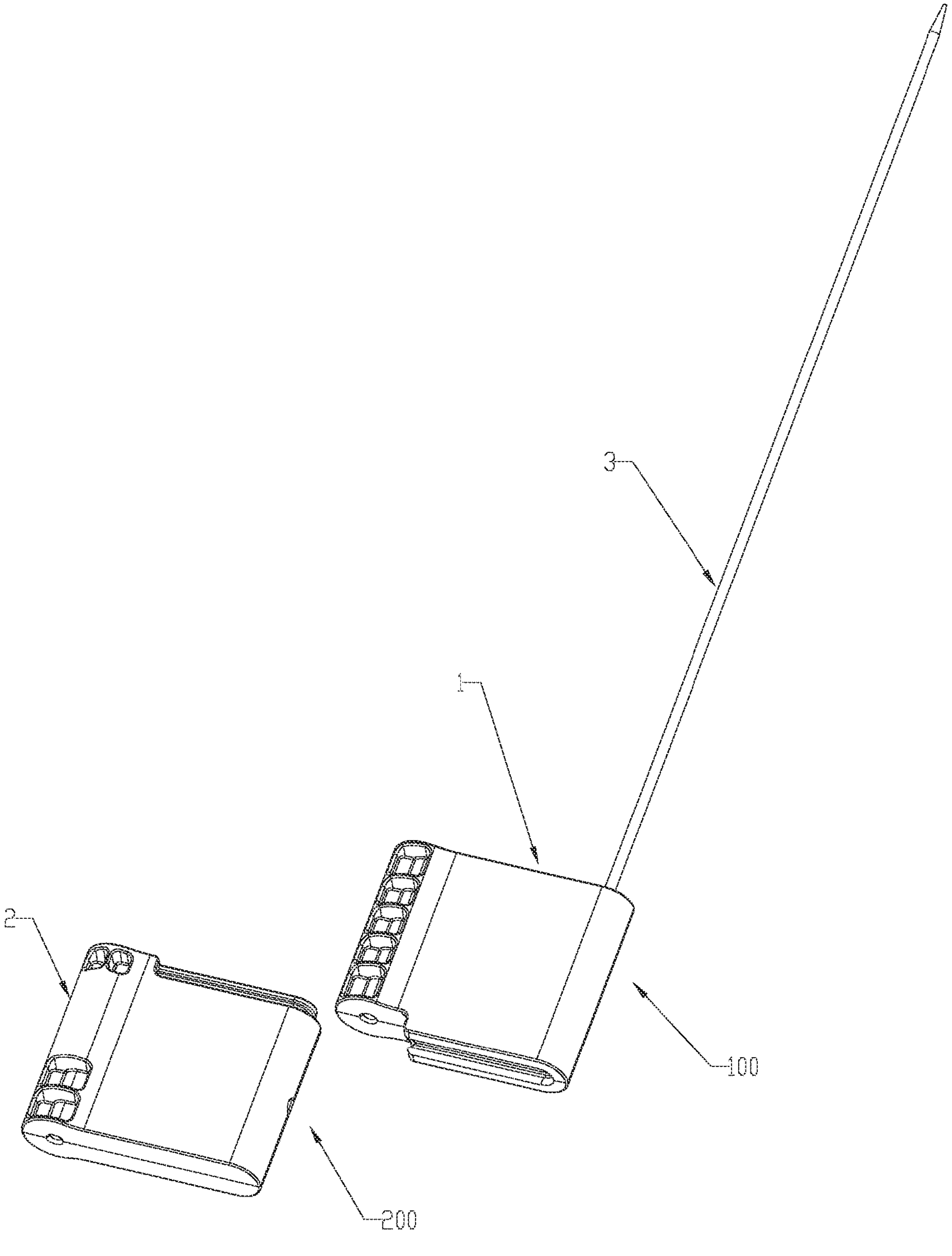
FIG. 1 depicts an exploded schematic view showing a cable lock with a locator according to an embodiment of the disclosure.

It should be noted that the embodiments of the disclosure and the features in the embodiments may be freely combined with each other without conflict.

In the description of the disclosure, it should be understood that the terms “center”, “longitudinal”, “lateral”, “up”, “down”, “front”, “rear”, “left”, “right”, “vertical”, “horizontal”, “top”, “bottom”, “inside”, “outside”, etc. indicate the orientation or position relationship based on the orientation or position relationship shown in the drawings, and are only for the convenience of describing the disclosure and simplifying the description, rather than indicating or implying that the device or component referred to must have a specific orientation, be constructed and operated in a specific orientation. And thus, those term shall not be understood as a limitation on the scope of protection of the disclosure. In addition, the terms “first” and “second” are only illustrative, and it is not intended to be interpreted as indicating or implying relative importance or implicitly indicating the number of indicated technical features. Thus, the features defined as “first”, “second” and so on may explicitly or implicitly include one or more of the features referred to. In the description of the disclosure, unless otherwise specified, “plurality” means two or more.

In the description of the disclosure, it should be noted that unless otherwise specified and limited, the terms “mount”, “connected” and “connection” should be broadly understood. For example, the connection can be a fixed connection, a detachable connection, or an integrated connection. And the connection can be a direct connection, can also be an indirect connection through an intermediate media, and can be a connection inside two elements. The specific meanings of the above terms in the disclosure can be understood through specific situations, by those having ordinary skills in the art.

The disclosure will be further illustrated in conjunction with the attached drawings and specific embodiments.

Embodiment One

As shown in FIG. 1, the cable lock with locator mainly includes two parts, i.e., a disposable part 100 which can be discarded after use, and a recyclable part 200 which can be reused.

The disposable part 100 includes a metal cable and a first lock body 1. The first lock body 1 preferably has a square upper housing 11.

The metal cable is preferably a steel cable 3. Alternatively, the metal cable may be a cable of another metal material.

The recyclable part 200 includes a second lock body 2. The second lock body 2 preferably has a square lower housing 21.

The first lock body 1 and the second lock body 2 respectively represent a part of the lock body, where the term “first” and “second” are only intended to distinguish different parts of the lock body, and are not intended to imply an order.

Figure 2:
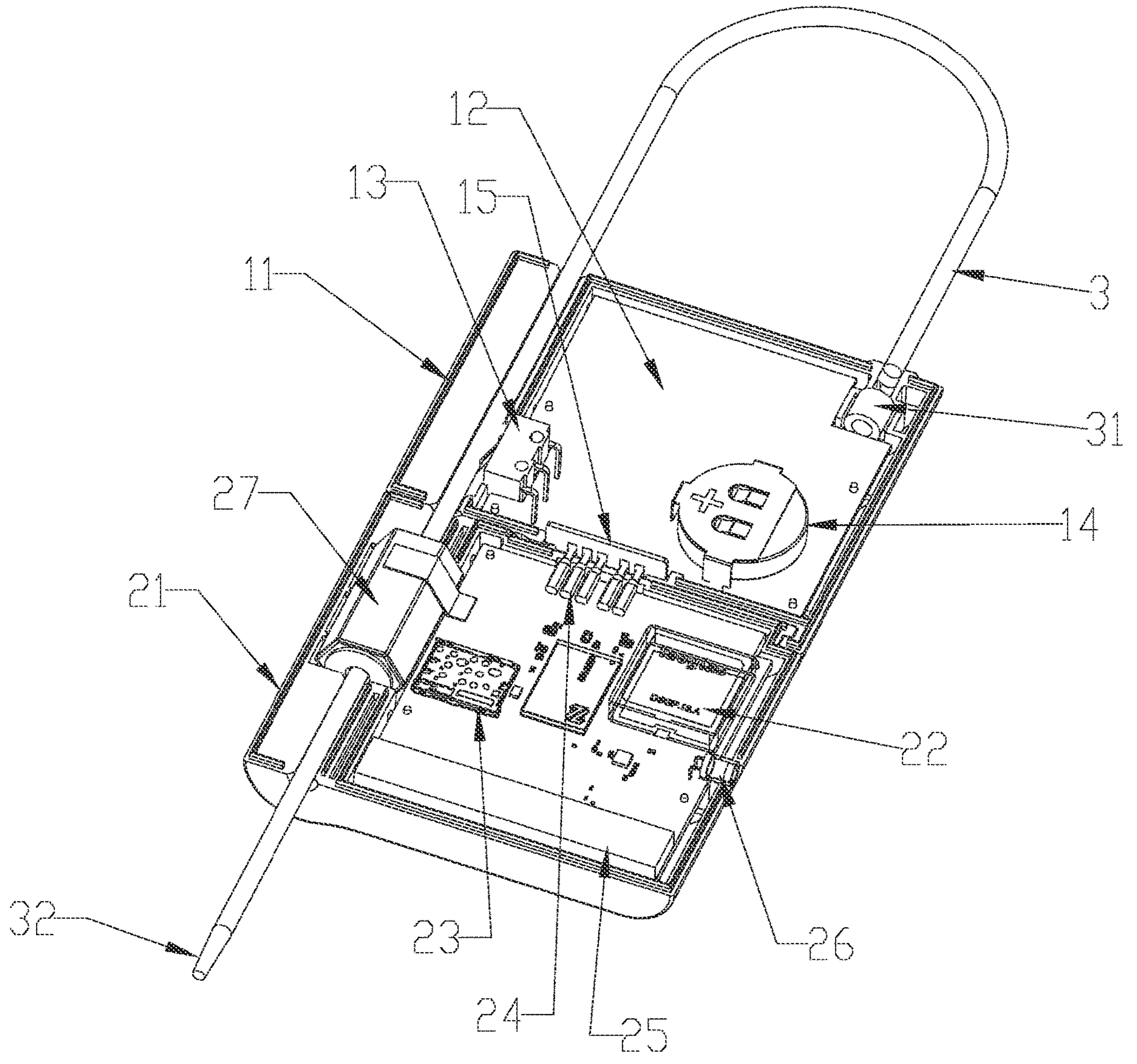
FIG. 2 depicts a schematic diagram showing the internal structure of a cable lock with a locator according to an embodiment of the disclosure.

As shown in FIG. 2, the first lock body 1 is provided with an RFID device 12. The second lock body 2 is provided with a locator 22. The first lock body 1 and the second lock body 2 can be integrated into one piece by a detachable structure.

The second lock body 2 is provided with a data transmitter 23 that is electrically connected with the locator 22. The real-time locating information of the locator 22 can be wirelessly transmitted to a remote terminal device through the data transmitter 23. For example, the locator 22 can transmit real-time locating information to a client or a background server through the data transmitter 23. The client can be a mobile phone or a handheld device of a user.

Figure 3:
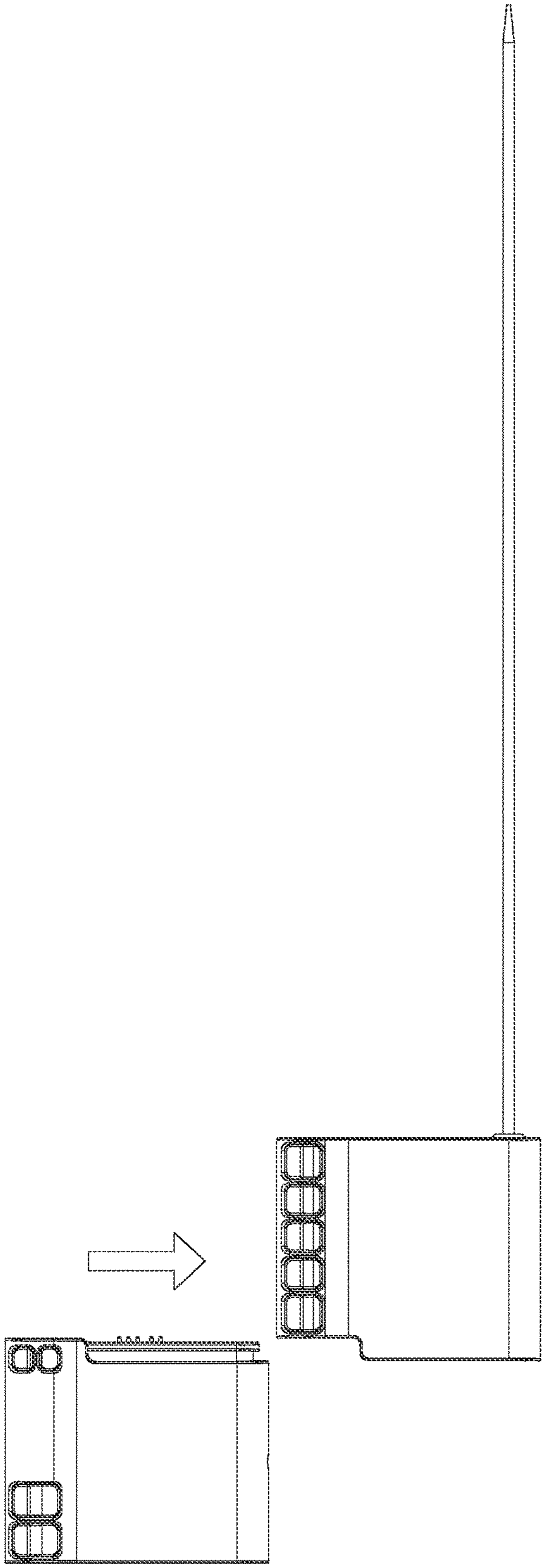
FIG. 3 depicts a schematic diagram showing the assembling process of a cable lock with a locator according to an embodiment of the disclosure.

As shown in FIG. 3, the first lock body 1 and the second lock body 2 can be connected through a detachable structure.

Figure 4:
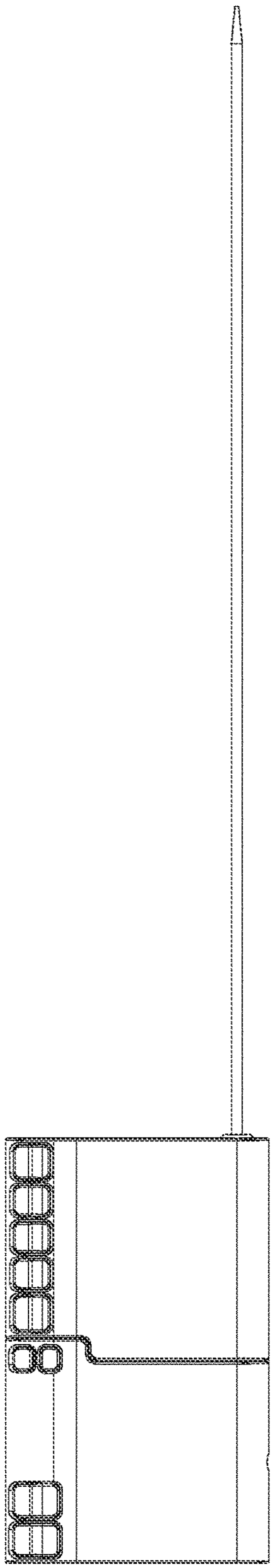
FIG. 4 depicts a schematic diagram showing the assembling process of a cable lock with a locator according to an embodiment of the disclosure.

As shown in FIG. 4, the first lock body 1 and the second lock body 2 are connected to form a cable lock with that is in an unlocked state.

Figure 5:
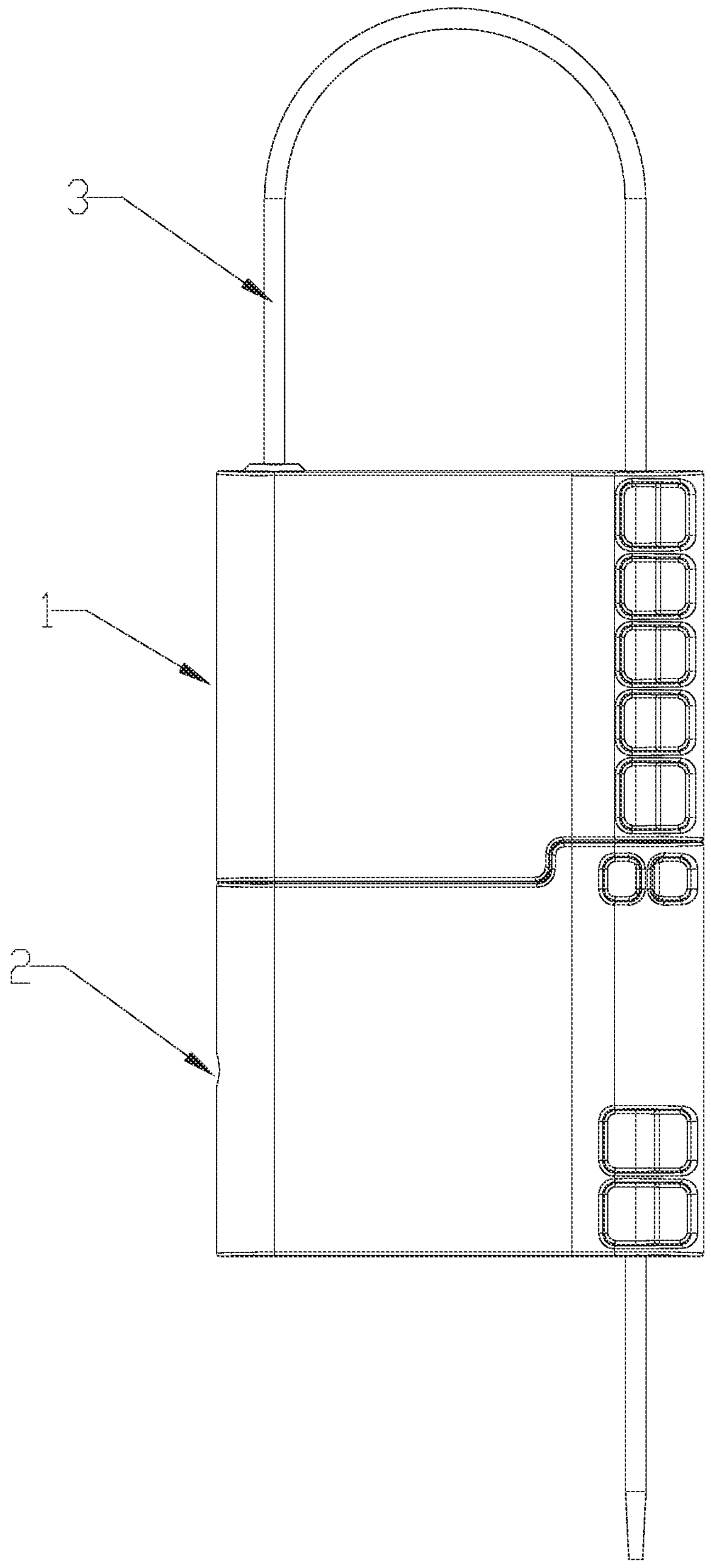
FIG. 5 depicts a schematic diagram showing the assembling process of a cable lock with a locator according to an embodiment of the disclosure.

As shown in FIG. 5, once the steel cable 3 passes through the first lock body 1 and then through the second lock body 2, the steel cable 3 can be locked thereby. Unlocking will not be possible unless the steel cable 3 is cut off.

Once the steel cable 3 is cut, the disposable part 100 is destroyed and can only be discarded. But the recyclable part 200 is not destroyed, which can be assembled with a new disposable part 100 through a detachable structure to form a new cable lock with such that the recyclable part 200 is recycled and reused. Thereby, the locating function of the cable lock is achieved while the cost is effectively controlled, such that the cost of the cable lock decreased, which is beneficial to the large-scale deployment of the cable lock.

The cable lock is locked on the container, such that the location information of the goods within the locked container is monitored in real time.

Embodiment Two

In this embodiment, the transmission of electrical signals between the disposable part 100 and the recyclable part 200 of the cable lock is improved based on embodiment one.

As shown in FIG. 2, the RFID device 12 is electrically connected with the data transmitter 23, so that the information of the RFID device 12 can be transmitted through the data transmitter 23, and the status of the RFID device 12 can be known remotely.

The first lock body 1 is provided with a power supply for supplying power to the RFID device 12, the locator 22 and the data transmitter 23. Since the first lock body 1 has more free space, mounting the power supply in the first lock body 1 is more conducive to the rational use of space.

The power supply is preferably a small button battery 14.

The power supply can be a rechargeable battery or non-rechargeable battery.

The first lock body 1 is provided with a first connector. The second lock body 2 is provided with a second connector. When the first lock body 1 and the second lock body 2 are integrated into one piece, the first connector is communicatively connected with the second connector, thereby realizing the transmission of electric signals between the disposable part 100 and the recyclable part 200.

The RFID device 12 is electrically connected with the first connector. The locator 22 and the data transmitter 23 are electrically connected with the second connector.

Figure 6:
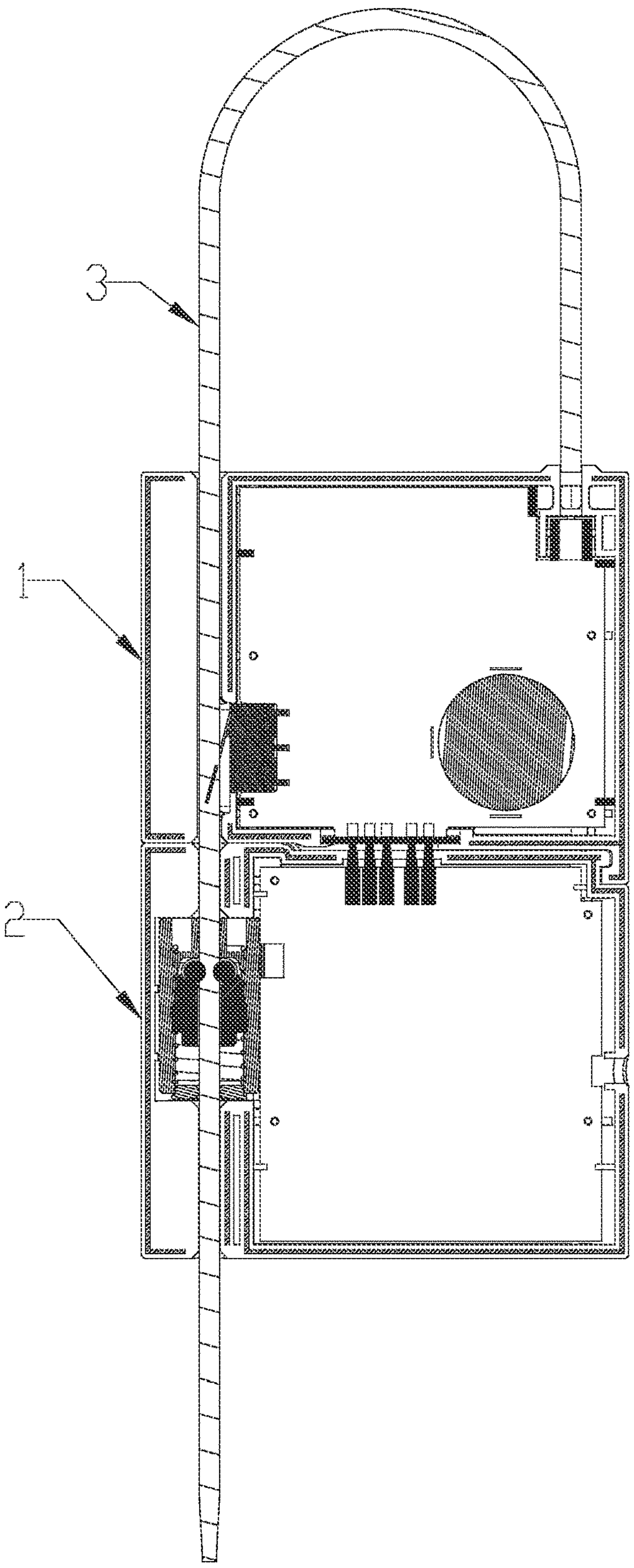
FIG. 6 depicts a schematic diagram showing the internal structure in a locked state of a cable lock with a locator according to an embodiment of the disclosure.
Figure 7:
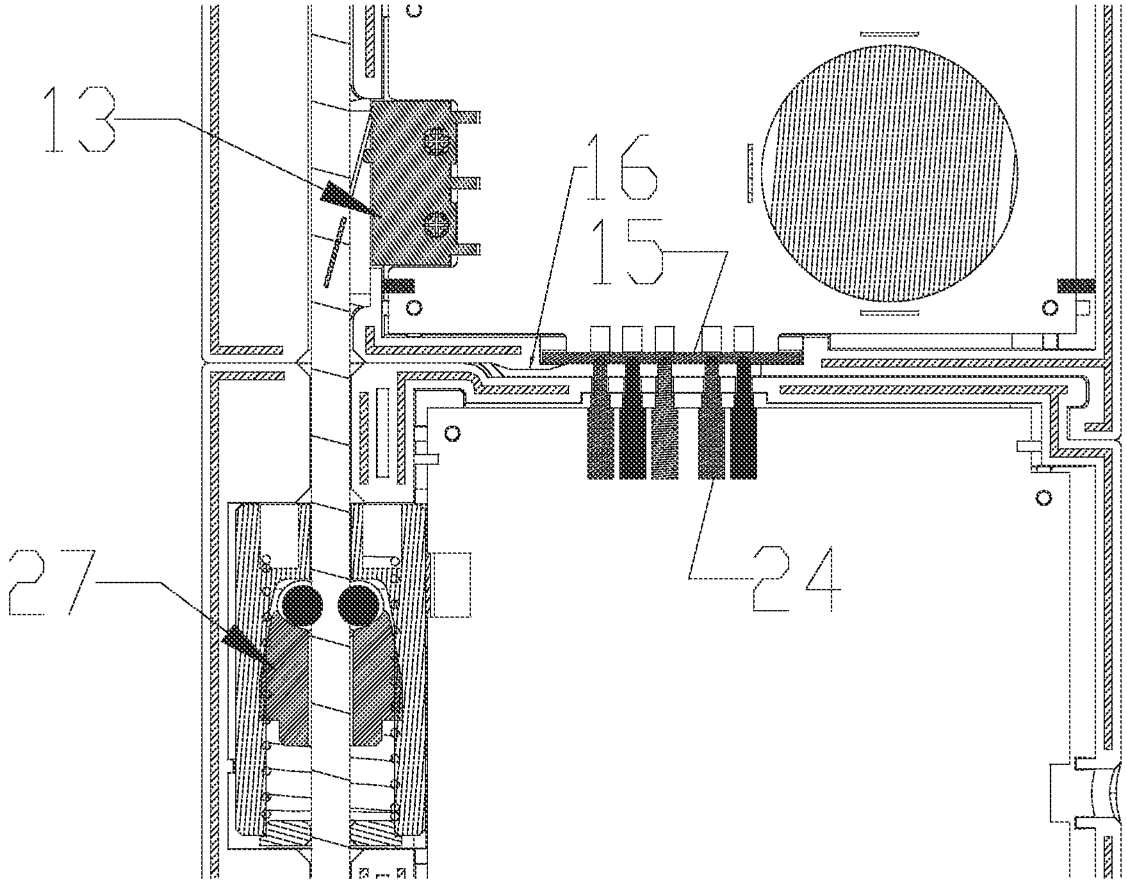
FIG. 7 depicts an enlarged schematic view showing a cable lock with a locator according to an embodiment of the disclosure.

As shown in FIGS. 6 and 7, the second connector is a pogo pin interface 24. The first connector is an electrically conductive sheet 15 which is in electrical connection and fits with the pogo pin interface 24. The first lock body 1 is provided with a guiding plate 16 which allows the pogo pin interface 24 to be released and compressed smoothly and flexibly. As the first lock body 1 and the second lock body 2 are connected through a detachable structure, the pogo pin interface 24 can slide in and electrically connect the electrically conductive sheet 15 with the help of the guiding plate 16. Thereby, the transmission of electrical signals between the disposable part 100 and the recyclable part 200 is achieved, and power supply and communication between the two devices can be achieved through the pogo pin interface.

The guiding plate 16 includes a guide-in slope for guiding the pogo pin interface 24 in and a guide-out slope for guiding the pogo pin interface 24 out.

The guiding plate 16 is preferably in the shape of an isosceles trapezoid.

The second lock body 2 is provided with an antenna 25 that is electrically connected with the data transmitter 23.

The second lock body 2 is provided with an indicator light 26 for state indication, such as the activation of the power supply.

Embodiment Three

In this embodiment, the arrangement of the power supply is modified based on embodiment two.

The position where the power supply is mounted, is adjusted from the first lock body 1 to the second lock body 2. In such an arrangement, the power supply directly supplies power to the locator 22 and the data transmitter 23, and then supplies power to the RFID device 12 through the connector.

Embodiment Four

The position of the connector is modified based on embodiment two.

A pogo pin interface is mounted on the first lock body 1. And an electrically conductive sheet is mounted on the second lock body 2.

Embodiment Five

In this embodiment, the locator 22 and the data transmitter 23 are selected on the basis of the embodiment one.

The locator 22 can be a Galileo device, a GPS device, a Beidou positioning system device, or another positioning system device.

The data transmitter 23 may be a GSM device, a GPRS device, or other wireless transmitters.

Embodiment Six

In this embodiment, the detachable structure is illustrated in detail based on embodiment one.

Figure 8:
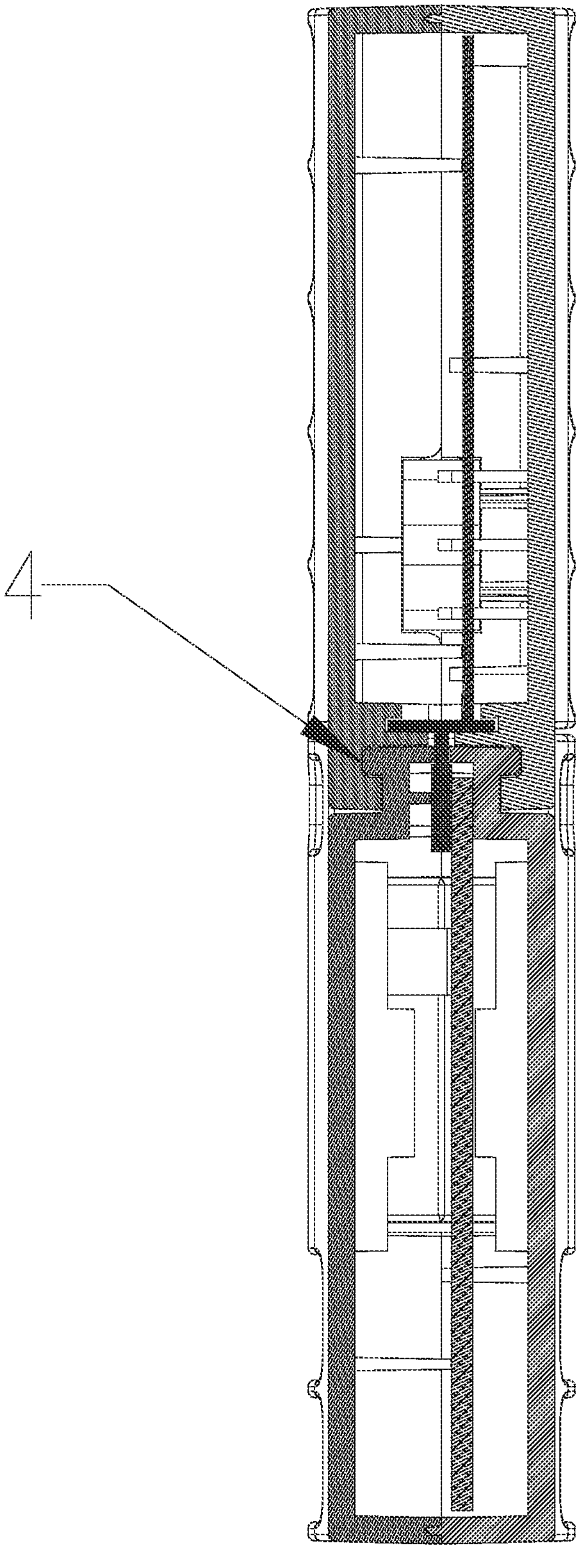
FIG. 8 depicts a schematic diagram showing a T-shaped docking structure of a cable lock with a locator according to an embodiment of the disclosure.
Figure 9:
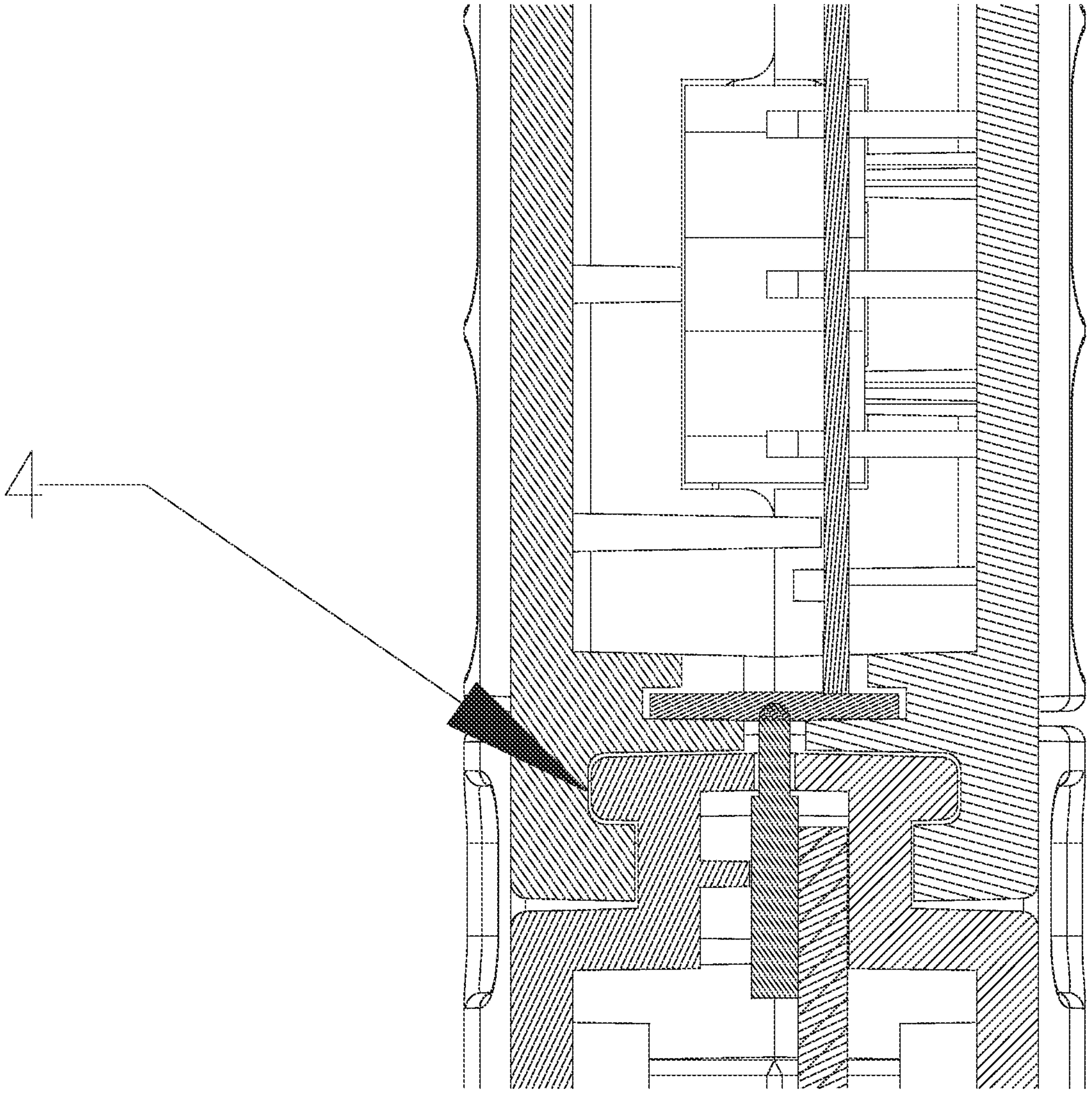
FIG. 9 depicts an enlarged schematic view showing the T-shaped docking structure of a cable lock with a locator according to an embodiment of the disclosure.

As shown in FIGS. 8 and 9, the detachable structure is a T-shaped docking structure 4, which can be matched with the steel cable 3 to form a stable upper and lower device.

Figure 10:
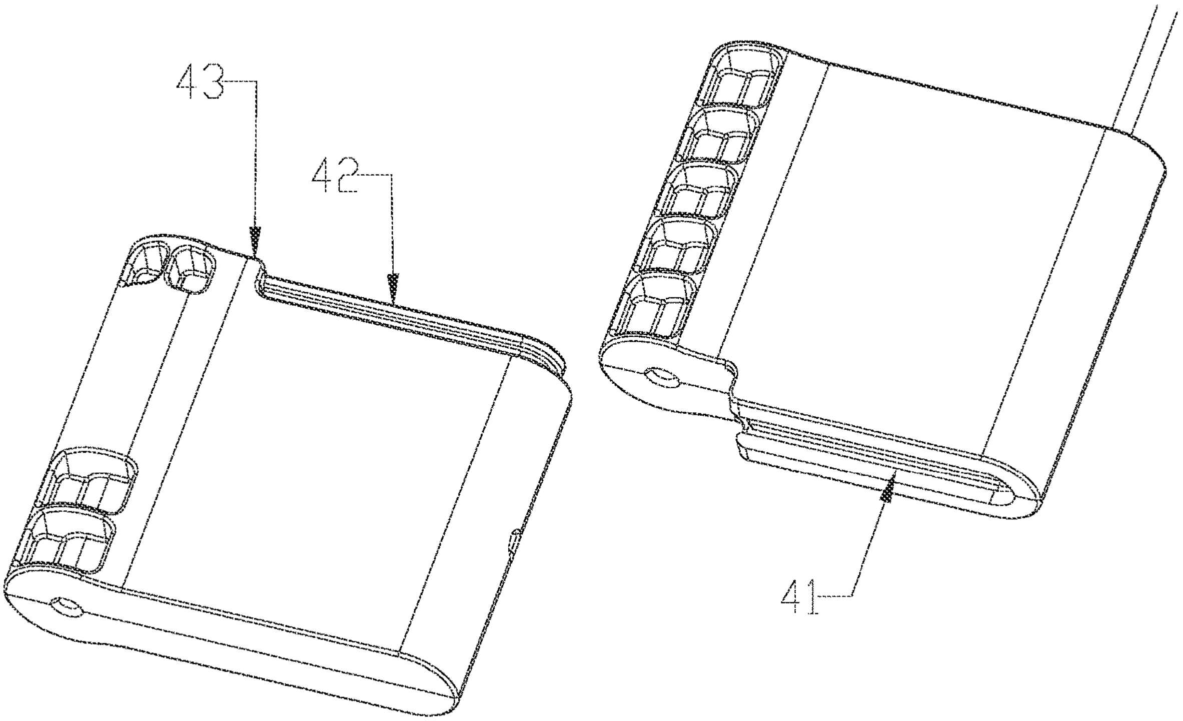
FIG. 10 depicts a docking schematic diagram showing a T-shaped docking structure of a cable lock with a locator according to an embodiment of the disclosure.
Figure 11:
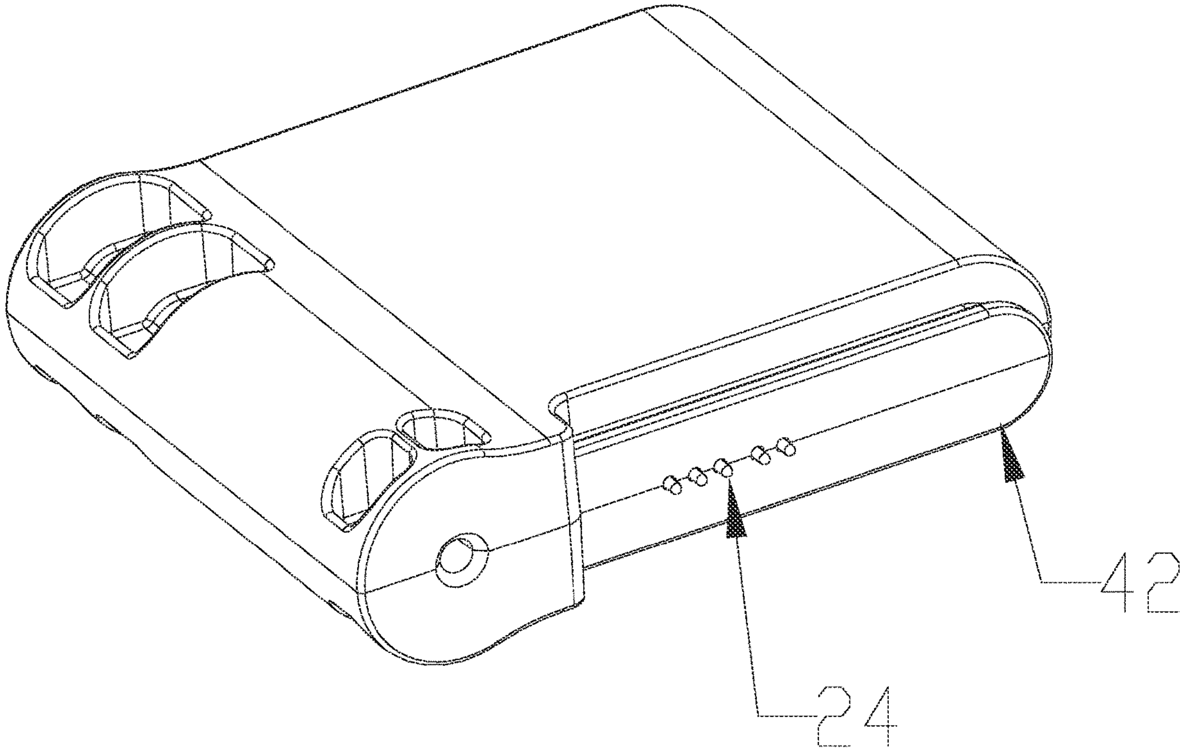
FIG. 11 depicts a schematic diagram showing a pogo pin interface of a cable lock with a locator according to an embodiment of the disclosure.

As shown in FIGS. 10 and 11, the T-shaped docking structure 4 includes a T-shaped guide rail 41, and a T-shaped slider 42 in sliding fits with the T-shaped guide rail 41.

The T-shaped guide rail 41 is arranged on the first lock body 1. The T-shaped slider 42 is arranged on the second lock body 2.

As shown in FIG. 11, the pogo pin interface 24 is mounted on the T-shaped docking structure 4. In particular, the pogo pin interface 24 can be mounted on the T-shaped slider 42, which can synchronously complete the docking of the connector when the lock body is docked.

As shown in FIG. 9, the T-shaped guide rail 41 is arranged above, the T-shaped slider 42 is arranged below, and the pogo pin interface 24 is mounted on the T-shaped slider 42, so that water can be prevented from entering the joint of the pin. That is, the T-shaped guide rail 41 acts as a waterproof wrap around the pogo pin interface 24, such that an enclosed space is thus formed. The pogo pin interface 24 is raised above the water inlet by the T-shaped slider 42. That is, the pogo pin interface 24 is mounted on a raised platform which is higher than the butt joint of the T-shaped guide rail 41 and the T-shaped slider 42. As such, when water flows from top to bottom, the water can enter the butt joint of the T-shaped guide rail 41 and the T-shaped slider 42 at most, but the water would not enter the space where the pogo pin interface 24 is located. Thereby, the rain-proof requirements of products are met.

The pogo pin interface 24 may also be mounted on the T-shaped guide rail 41.

As shown in FIG. 10, a position limit step 43 is provided at an end of the T-shaped slider 42 to limit the position where the first lock body 1 and the second lock body 2 are docked in position.

Embodiment Seven

In this embodiment, the positions of the T-shaped guide rail and the T-shaped slider are exchanged on the basis of embodiment six. Therefore, the T-shaped slider is arranged on the first lock body 1 and the T-shaped guide rail is arranged on the second lock body 2.

Embodiment Eight

The detachable structure is modified on the basis of embodiment six.

The guide rail of an alternative shape can be employed to cooperate with the slider to form a detachable structure.

A buckle structure can be employed to form a detachable structure. In an example, a structure of a male buckle mated with a female buckle is employed.

Alternatively, fasteners can be employed to form a detachable structure, such as screws and threaded holes, or screws and nuts.

Embodiment Nine

In this embodiment, the arrangement of the first lock body 1 and the second lock body 2 is further illustrated.

As shown in FIG. 3, the first lock body 1 and the second lock body 2 can be arranged in an up-and-down fashion. That is, the first lock body 1 is the upper lock body and the second lock body 2 is the lower lock body.

Alternatively, the first lock body and the second lock body can also be arranged in a left-and-right fashion.

The docking of the two locking bodies can be made along a horizontal direction (as shown in FIG. 3), a vertical direction, or an inclined direction.

Embodiment Ten

This embodiment further illustrates how the cable lock is locked on the basis of the embodiment one.

As shown in FIGS. 2, 3 and 4, before locking, an end 31 of the steel cable 3 is fixed onto the first lock body 1, and the other end of the steel cable 3 is a free end 32.

As shown in FIGS. 2 and 5, after locking, the free end of the steel cable 3 is firmly locked on the second lock body 2.

The second lock body 2 is provided with a lock core 27. The free end 32 of the steel cable 3 can pass through the lock core 27 in a single direction, i.e., a first direction. As the steel cable 3 passes through the lock core 27, the lock core 27 firmly locks the steel cable 3 in a second direction opposite to the first direction. As such, unlocking would not be possible unless the steel cable 3 is cut off.

The first lock body 1 is provided with a power microswitch 13 for triggering the power supply. The free end 32 of the steel cable 3 can pass through the first lock body 1. The power microswitch 13 is triggered when the steel cable 3 passes through the first lock body 1.

The free end 31 of the steel cable 3 passes through the first lock body 1 and then through the second lock body 2.

The first lock body 1 and the second lock body 2 are both provided with a through hole through which steel cable 3 passes.

An embodiment of the present disclosure provides a cable lock with a locator in which a locator is appended based on the existing cable lock to realize the real-time positioning function of the locked container. The RFID device is a disposable product. The newly appended locator can be disassembled and reused, so that the real-time positioning function can be realized without greatly increasing the use cost, and the scene requirements in a wider area can be realized.

The above content is a further detailed description of some embodiments of the disclosure in conjunction with detailed embodiments, and it is not intended to limit the disclosure to these descriptions. For a person having ordinary skill in the art, various deductions or alterations can be made without departing from the concept of the disclosure, and these should be regarded as falling within the protection scope of the disclosure.

What is claimed is:

1. A cable lock with a locator, comprising a disposable part and a recyclable part;

wherein the disposable part comprises a metal cable and a first lock body, and the first lock body is provided with an RFID device;

wherein the recyclable part comprises a second lock body, and the second lock body is provided with a locator;

wherein the first lock body is provided with a first connector, the second lock body is provided with a second connector; and the first connector is electrically connected with the second connector when the first lock body and the second lock body are connected into one piece;

wherein one of the first connector and the second connector is a pogo pin interface.

2. The cable lock according to claim 1, wherein the first lock body and the second lock body are connected by means of a detachable structure.

3. The cable lock according to claim 2, wherein the detachable structure is a T-shaped docking structure, and the T-shaped docking structure comprises a T-shaped guide rail and a T-shaped slider in sliding fit with the T-shaped guide rail.

4. The cable lock according to claim 3, wherein the T-shaped guide rail and the T-shaped slider are correspondingly arranged on the first lock body and the second lock body respectively.

5. The cable lock according to claim 4, wherein an end of the T-shaped slider is provided with a limiting step.

6. The cable lock according to claim 1, wherein the second lock body is provided with a data transmitter, and the locator is electrically connected with the data transmitter.

7. The cable lock according to claim 6, wherein the RFID device is electrically connected with the data transmitter.

8. The cable lock according to claim 6, wherein the data transmitter is a GSM device or a GPRS device, wherein the second lock body is provided with an antenna that is electrically connected with the data transmitter, wherein the locator is at least one of a GPS device, a Beidou positioning system device, or a Galileo positioning system device.

9. The cable lock according to claim 1, wherein the RFID device is electrically connected with the first connector, and the data transmitter is electrically connected with the second connector.

10. The cable lock according to claim 1, wherein when the second connector is the pogo pin interface, the first lock body is provided with a guiding plate; and when the first connector is the pogo pin interface, the second lock body is provided with the guiding plate, wherein the guiding plate has a lead-in slope and a lead-out slope.

11. The cable lock according to claim 1, wherein a power supply is arranged on the first lock body, and the power supply is electrically connected with the first connector.

12. The cable lock according to claim 1, wherein a power supply is arranged on at least one of the first lock body or the second lock body.

13. The cable lock according to claim 1, wherein an end of the metal cable is fixed on the first lock body.

14. The cable lock according to claim 1, wherein the second lock body is provided with a lock core, and when the metal cable passes through the lock core in a single direction, the lock core locks the cable in an opposite direction.

15. The cable lock according to claim 1, wherein the first lock body is provided with a power microswitch, and the power microswitch is triggered when the metal cable passes through the first lock body.

16. The cable lock according to claim 1, wherein both the first lock body and the second lock body are provided with a through hole through which the metal cable passes through.

* * * * *